JAMES A. LOWE.
Improvement in Drain-Screw Attachment for Stench-Traps.
No. 127,620.  Patented June 4, 1872.

Witnesses:

James A. Lowe

UNITED STATES PATENT OFFICE.

JAMES A. LOWE, OF NEW YORK, N. Y.

IMPROVEMENT IN DRAIN-SCREW ATTACHMENTS FOR STENCH-TRAPS.

Specification forming part of Letters Patent No. 127,620, dated June 4, 1872.

Specification describing an Improvement in Drain-Screw Attachments for Stench-Traps, the invention of JAMES A. LOWE, of the city, county, and State of New York.

This invention relates to water or stench traps, both when cast with and without a seam in lead or composition; and consists in a novel insertion of or method of embedding a hard metal nut or screw-box within the lower curve of the trap or projection therefrom, for reception of the tap or drain-screw, and whereby I combine a stiff or solid and durable hard metal bearing for the thread of the screw with a soft-metal facing for the head or heel of the screw to make close or water-tight the drain hole or opening in the trap.

Figure 1:
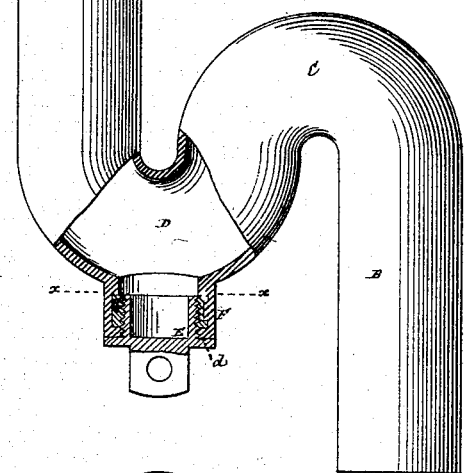
Figure 2:

In the accompanying drawing, which forms part of this specification, Figure 1 represents a partly broken or sectional side view of a soft-metal or composition stench-trap with my improvement applied to it; Fig. 2, a horizontal section at the line $x\ x$; and Fig. 3, a sectional elevation of the mold in part with cores, and hard-metal nut as arranged for casting a trap in accordance with the invention.

Similar letters of reference indicate corresponding parts throughout the several figures of the drawing.

A represents the upper leg, and B the lower one, of a cast soft-metal or composition trap, formed with an upper curve, C, and lower curve D, the latter of which has the opening in it for reception of the screw E, by which provision is made for clearing the trap, when required, of matter liable to choke or foul it. The opening in the lower curve D, however, does not receive the screw direct, and has not the female thread cast or formed in it, the softness of the metal or composition of which the trap is made being but poorly adapted, even though a coarse thread be used, to receive or hold the screw. Accordingly while the lower curve D is formed with a bottom socket or branch, F, for reception of the screw, the latter is made to fit a hard-metal nut or box, G, embedded within said neck, yet a soft bearing is formed for the head of the screw to bear against by casting the socket F with a facing or seat, $d$, beyond or outside of the nut for the head of the screw to make a close or tight joint with, and which it would be difficult or impossible to accomplish were the head of the screw to bear against the hard metal of the nut or box. In this way I combine a stiff or solid and durable hard-metal bearing for the thread of the screw with a soft-metal facing for the head of it.

Figure 3:
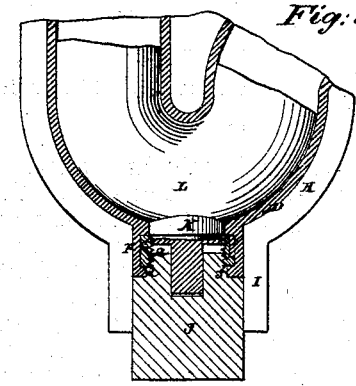

Figure 3 of the drawing explains how the hard-metal nut or box G, which is made of brass, may be embedded, as described, in the socket F. Thus the portion of the mold H, in which the lower curve D of the trap is cast, has its branch I, that forms the socket F, made longer than the latter, so as to receive closely within it a removable core, J. This core is reduced at its inner end $e$, forming a mandrel to receive over it the nut G, that is of suitable size to allow of the metal of which the socket F is formed to flow around it and around a shoulder, $f$, on the inner face of the body of the core in rear of the reduced end $e$ to form the soft-metal facing or seat $d$ on the outer end of the socket F for the head of the nut E. The metal of which the trap is made is prevented from running into or filling the nut G, and the embedding of the latter in the metal of the socket perfected; also the opening through the socket to the inside of the trap established by a detachable suplementary core, K, of less diameter than the whole nut or box G, but of sufficient size to cover or close the bore of the nut, and formed with a shank at its outer end to enter the core J, and shaped at its inner end to fit the core L of the curved portion D of the trap.

The two cores, J and K, holding the nut or screw-box G in between them, being entered in the mold, as described, the lead or composition is then run into the mold and the trap cast with the hard-metal nut firmly embedded in it, and so as to leave a soft-metal facing or seat, $d$, for the head of the screw, the core J, after the casting is made, being removed from the outside and the supplementary core K being drawn out from the inside of the trap.

The nut or box G may be formed with a flange on either of its ends, and with side ribs $s$ to insure its firm hold in the soft metal of the casting, and to prevent the nut from turning. Said nut or screw box may have the screw-thread formed in it either before its insertion in the mold or after the trap has been cast.

Furthermore, it is immaterial, so far as the improvement is concerned, whether the legs and curved portions of the trap be cast in one piece or separate, and whether the trap be made with or without a seam in it.

What is here claimed, and desired to be secured by Letters Patent, is—

The combination, with the lower curved or drain-screw portion D of the trap, when made of lead or other soft metal or composition, of the hard-metal nut or screw-box G embedded in the metal of the trap by casting, and with an outside facing or seat, $d$, of the same metal or composition as the trap, or its curved portion D, substantially as and for the purposes herein set forth.

JAMES A. LOWE.

Witnesses:
 FRED. HAYNES,
 R. E. RABEAU.